United States Patent
Tucker

(10) Patent No.: US 8,134,588 B2
(45) Date of Patent: Mar. 13, 2012

(54) SECURE VIDEO TELECONFERENCING ROOM CONTROL ISOLATOR

(75) Inventor: Richard Warren Tucker, Lancaster, VA (US)

(73) Assignee: Freeport Technologies, Incorporated, Herndon, VA (US)

( * ) Notice: Subject to any disclaimer, the term of this patent is extended or adjusted under 35 U.S.C. 154(b) by 428 days.

(21) Appl. No.: 12/565,253

(22) Filed: Sep. 23, 2009

(65) Prior Publication Data

US 2011/0069144 A1     Mar. 24, 2011

(51) Int. Cl.
*H04N 7/14*     (2006.01)
(52) U.S. Cl. ............ 348/14.13; 348/14.08; 348/14.12
(58) Field of Classification Search .... 348/14.01–14.16; 370/264, 401
See application file for complete search history.

(56) References Cited

U.S. PATENT DOCUMENTS

2005/0243742 A1*   11/2005   Hansen .......... 370/264

\* cited by examiner

*Primary Examiner* — Melur Ramakrishnaiah
(74) *Attorney, Agent, or Firm* — Locke Lord LLP

(57) ABSTRACT

Method, system, and computer program product example embodiments of the invention are disclosed to provide a secure room control isolator for a multi-network secure video teleconferencing room that meets the DISA and other standard security requirements. An example embodiment of the invention is a secure room control isolator coupled between a video teleconferencing room controller and a codec, to enable control commands to be sent from the room controller to the codec, but which permits only status information to be returned from the codec to the room controller. In this manner, classified information in the codec cannot be accessed by the room controller.

15 Claims, 5 Drawing Sheets

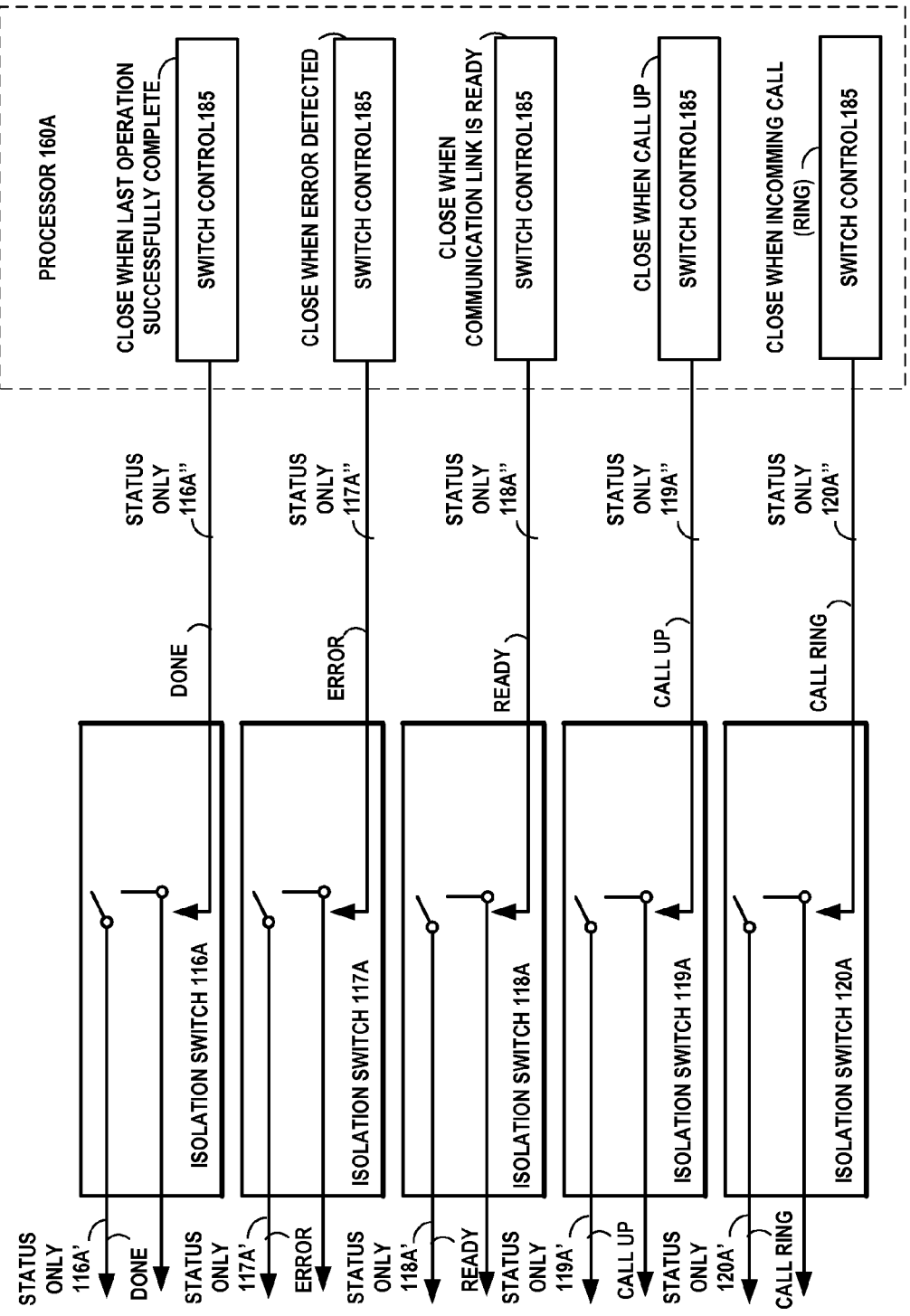

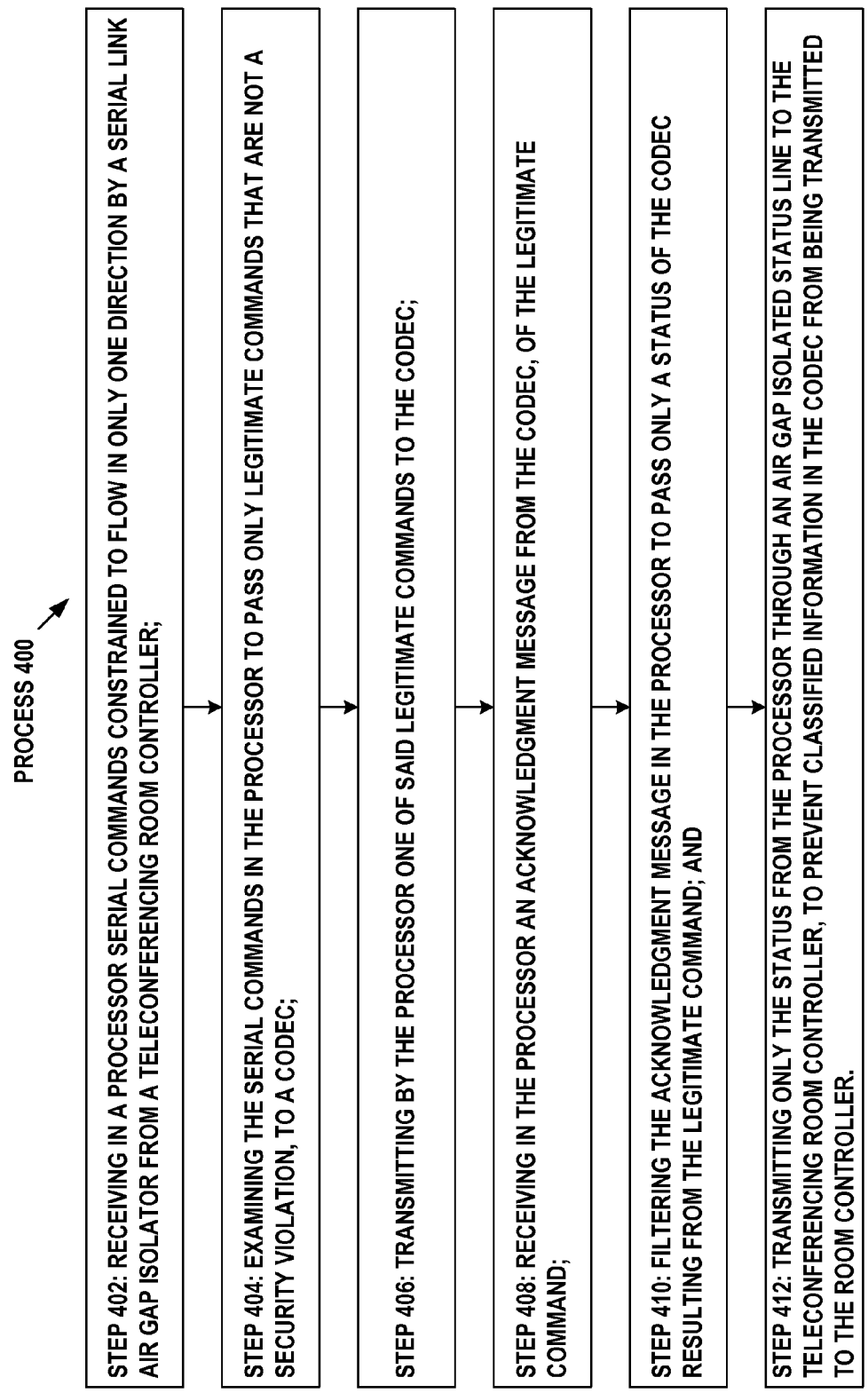

SECURE VIDEO TELECONFERENCING ROOM CONTROL ISOLATOR

FIELD

The technical field relates to multi-network secure video teleconferencing (VTC) and more particularly relates to providing secure control of a multi-network secure video teleconferencing room.

BACKGROUND

Dedicated video teleconference (VTC) systems are non-portable systems used for large rooms and auditoriums and for small meeting rooms to enable two or more locations to simultaneously interact via two-way video and audio transmissions. A video teleconference (VTC) system includes video cameras and microphones to capture pictures and sounds in the meeting room for transmission over a telecommunications network to a remote VTC system. A video teleconference (VTC) system also includes a television or projector and loudspeakers to present pictures and sounds received over the telecommunications network from the remote VTC system. Because of the large quantity of data necessary to represent the video and audio information, real time digital compression must be employed to compress transmitted video and audio streams. Digital compression and decompression of video and audio streams is performed by a codec (coder/decoder). Picture data and audio data captured by video cameras and microphones in the meeting room is input to the codec for digital compression before transmission on the telecommunications network. Digitally compressed picture data and audio data received from the telecommunications network is input to the codec for digital decompression and then output to the television or projector and loudspeakers.

The telecommunications networks can range from packet switched Internet links to dedicated, circuit switched trunks that may include international links through undersea fiber optical cables. The protocol used for VTC transmission across circuit switched networks is the H.320 suite of protocols promulgated by the ITU-T for running Multimedia (Audio/Video/Data) over ISDN based networks, which is incorporated herein by reference. The protocols that are commonly used for VTC transmission across IP based networks are the H.323 suite of protocols promulgated by the ITU Telecommunication Standardization Sector (ITU-T) to provide audio-visual communication sessions on any packet network and the SIP protocol that is an Internet Engineering Task Force (IETF) protocol which provides signaling control for voice and video communication sessions, which are incorporated herein by reference.

Where physical and operational security is required for video teleconferencing, the entire VTC system must be configured to support the requisite security. The primary security issue with VTC systems is confidentiality, which relates, not only to the confidentiality of VTC traffic on the network, but also to the confidentiality of the collateral information in the room in which the VTC system is placed. In addition, access control needs to be secure to avoid a VTC system being compromised and remotely controlled over an IP network. Because these vulnerabilities are more prevalent in Ethernet/IP based VTC system implementations, extra consideration must be given to the network architecture supporting the VTC system as well as the configuration of the system device itself.

Centralized multi-network secure video teleconferencing switching systems provide VTC access to multiple networks using a single VTC system. The U.S. Department of Defense security requirements for such systems have been defined by the Defense Information Security Administration (DISA) in the *Video Tele-Conference Security Technical Implementation Guide*, Version 1, Release 1, Jan. 8, 2008, which is incorporated herein by reference.

Centralized multi-network secure video teleconferencing security systems are currently being deployed in racks along with the audio-visual (AV) equipment required in AV room systems. A room controller enables the centralized control of audio-video components in a dedicated room designed for video teleconferencing, such as commanding the codec to send a camera image, to display near and far sides, to dial a call, to increase audio gain, commanding adjustments to plasma display panels, commanding adjustments to cameras, and so on. Presently, room controllers are connected to the codec in the VTC system, no matter whether the codec is connected to a classified or unclassified network. Although the room controller is not intended to access sensitive information in the codec, it is possible for an interloper to gain unauthorized access to sensitive information in the codec. What is needed is a secure video teleconferencing room controller that meets the DISA and other standard security requirements for multi-network systems and enhances operation, management and control of a video teleconferencing room.

SUMMARY

Method, system, and computer program product example embodiments of the invention are disclosed to provide a secure room control isolator for a multi-network secure video teleconferencing room that meets the DISA and other standard security requirements. An example embodiment of the invention is a secure room control isolator coupled between a video teleconferencing room controller and a codec, to enable control commands to be sent from the room controller to the codec, but which permits only status information to be returned from the codec to the room controller. In this manner, classified information in the codec cannot be accessed by the room controller.

An example embodiment of the invention is a secure room control isolator that allows serial commands to flow only in one direction from the teleconferencing room controller to the codec through a serial link air gap isolator. A processor connected to the serial link air gap isolator, filters the serial commands and passes only legitimate commands to the codec. Commands are blocked that would request the codec to perform actions that might be considered a security violation.

An example embodiment of the invention is a secure room control isolator that includes a plurality of air gap isolated status lines that are returned to the teleconferencing room controller, providing simple two state indicators. This prevents messages and possibly classified information from being transmitted from the codec to the teleconferencing room controller in response to the serial commands received by the codec. Typical status indicators are: 1) Command Acknowledged, 2) Error, 3) Ready, 4) Call Up, and 5) Incoming Call.

The processor coupled between air gap isolated status lines and the codec receives an acknowledgment message of the serial command from the codec, filters the message to pass only the status resulting from the serial command, and signals the teleconferencing room controller of success or error via the status lines. In this manner, classified information in the codec cannot be accessed by the room controller.

An example method performed by the secure room control isolator has the following steps:

receiving in a processor serial commands constrained to flow in only one direction by a serial link air gap isolator from a teleconferencing room controller;

transmitting by the processor one of said commands to a codec;

receiving in the processor an acknowledgment message from the codec, of the command;

filtering the acknowledgment message in the processor to pass only a status of the codec resulting from the command; and transmitting only the status from the processor through an air gap isolated status line to the teleconferencing room controller, to prevent classified information in the codec from being transmitted to the room controller.

The example method may include the further step of examining the serial commands in the processor to pass only legitimate commands that are not a security violation, to the codec.

The method performed by the secure room control isolator may be implemented by a computer program as a sequence of programmable instructions which, when executed by a processor associated with the secure room control isolator, carries out the functions of the secure room control isolator. The example program may be stored in a computer readable medium storing computer executable program code. An example of such a program is as follows.

computer executable program code in the medium which, when executed by a processor, performs the step of receiving serial commands constrained to flow in only one direction by a serial link air gap isolator from a teleconferencing room controller;

computer executable program code in the medium which, when executed by a processor, performs the step of transmitting by the processor one of said commands to a codec;

computer executable program code in the medium which, when executed by a processor, performs the step of receiving in the processor an acknowledgment message from the codec, of the command;

computer executable program code in the medium which, when executed by a processor, performs the step of filtering the acknowledgment message in the processor to pass only a status of the codec resulting from the command; and computer executable program code in the medium which, when executed by a processor, performs the step of transmitting only the status from the processor through an air gap isolated status line to the teleconferencing room controller, to prevent classified information in the codec from being transmitted to the room controller.

The example program code may further include computer executable program code in the medium which, when executed by a processor, performs the step of examining the serial commands in the processor to pass only legitimate commands that are not a security violation, to the codec.

An example apparatus embodying the secure room control isolator may be as follows.

a serial link air gap isolator coupled to a teleconferencing room controller;

at least one air gap isolated status line coupled to the teleconferencing room controller;

a processor and a memory coupled between the serial link air gap isolator and a codec, configured with program instructions, which when executed by the processor, receives serial commands constrained to flow in only one direction by the serial link air gap isolator from the teleconferencing room controller;

the processor and memory configured with program instructions, which when executed by the processor, transmits one of said commands to the codec;

the processor and memory configured with program instructions, which when executed by the processor, receives an acknowledgment message from the codec, of the command;

the processor and memory configured with program instructions, which when executed by the processor, filters the acknowledgment message to pass only a status of the codec resulting from the command; and the processor and memory configured with program instructions, which when executed by the processor, transmits only the status through the air gap isolated status line to the teleconferencing room controller, to prevent classified information in the codec from being transmitted to the room controller.

The example apparatus may further include the processor and memory configured with program instructions, which when executed by the processor, examines the serial commands to pass only legitimate commands that are not a security violation, to the codec.

The resulting embodiments of the invention provide a secure room control isolator that meets the DISA and other standard security requirements and enhances operation, management and control of a video teleconferencing room.

DESCRIPTION OF THE FIGURES

Example embodiments of the invention are shown in the accompanying figures.

FIG. 3 is an example network diagram showing the details of the air gap isolated status lines controlled by the processor and memory of the secure room control isolator of FIG. 1.

FIG. 4 is an example flow diagram of the operation of the secure room control isolator.

DISCUSSION OF EXAMPLE EMBODIMENTS OF THE INVENTION

Figure 1:
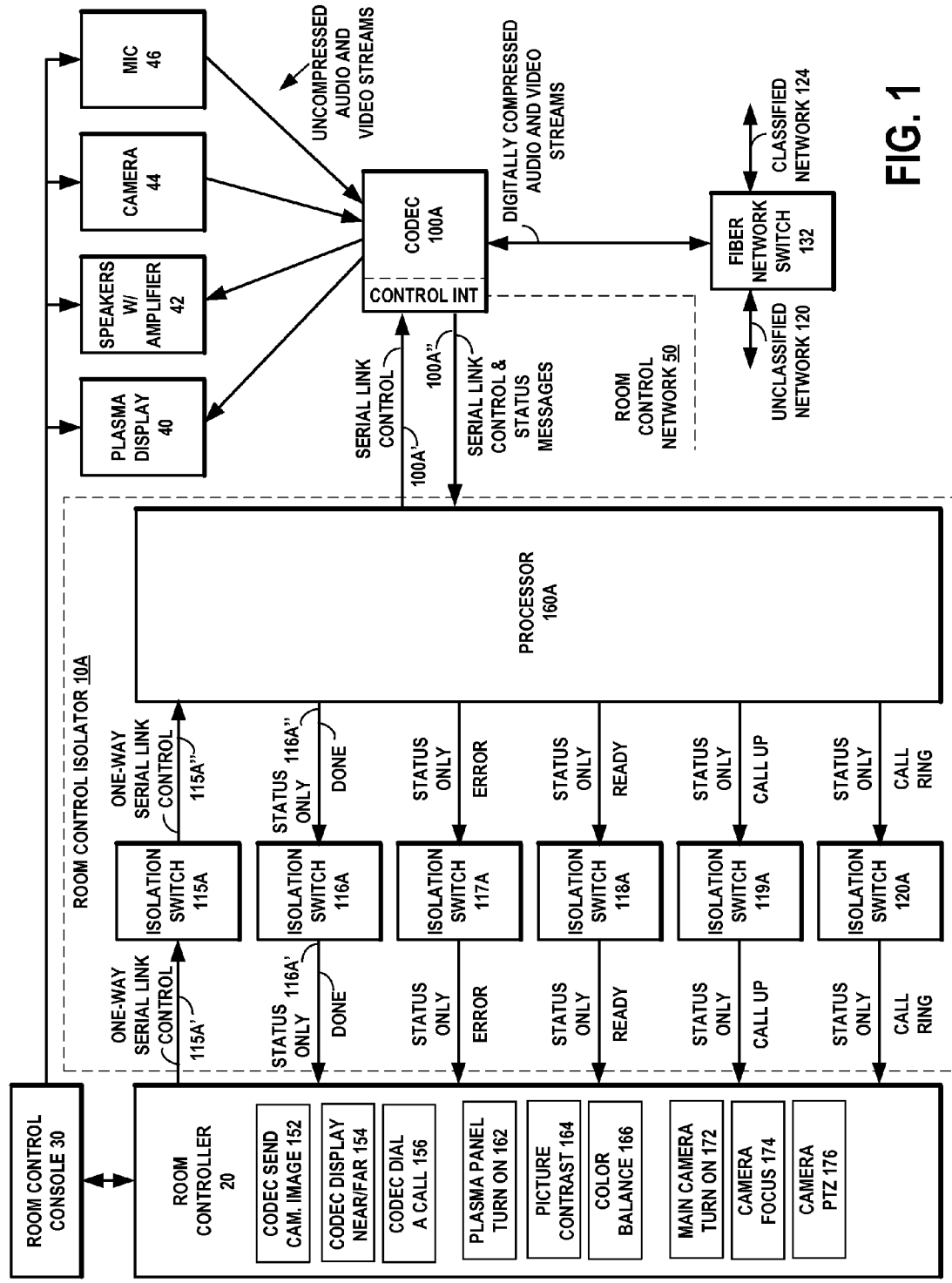
FIG. 1 is an example network diagram showing a secure room control isolator connected between a teleconferencing room controller and a codec.

FIG. 1 is an example network diagram showing a secure room control isolator 10A connected between a teleconferencing room controller 20 in a room control network 50 and a codec 100A. A plasma display 40 and speakers with amplifier 42 may also be controlled by the teleconferencing room controller 20, to present uncompressed video and audio streams decoded by the codec 100A, as received by the codec in compressed form from the fiber network switch 132. A camera 44 and microphone 46 capture video and audio signals in the meeting room and input them as audio-visual streams to the codec 100A for compression and transmission via the fiber network switch 132. The teleconferencing room controller 20 receives room control commands from the room control consol 30 to control the codec in the video conferencing room, such as for example command 152 for the codec to send a camera image, command 154 for the codec to display the meeting room (near side) and the remote VTC system (far side), and command 156 for the codec to dial a call. The teleconferencing room controller 20 may command adjustments to plasma display panels 40, for example command 162 to turn on the plasma display panel 40, command 164 to adjust the picture contrast, and command 166 to adjust the color balance. The teleconferencing room controller 20 may also receive room control commands from the room control consol 30 to control the main camera 44 in the video conferencing room, such as command 172 to turn on the main camera 44, command 174 to adjust the focus of the camera, and command 176 to adjust the camera pan/tilt/zoom (PTZ). Other example commands may be for example a command for turning on a white board and a command for turning on front speakers. The codec 100A may be selectively connected to classified and unclassified traffic networks 60 such as telecommunication networks 120 and 124 by means of the fiber network switch 132 in a network operations center. The teleconferencing networks 120 and 124 may be Internet, ISDN, or other telecommunication networks enabling secure and unsecure video teleconferencing sessions with remote video teleconferencing endpoints.

The purpose of the room control isolator 10A is to prevent the room controller 20 from accessing sensitive information in the codec 100A, to prevent an interloper from gaining unauthorized access to sensitive or classified information that may be present in the codec. The room controller isolator 10A meets the DISA and other standard security requirements and enhance operation, management and control of the video teleconferencing room.

In an example embodiment of the invention, the room control isolator 10A of FIG. 1 is coupled between the video teleconferencing room controller 20 and the codec 100A, to enable control commands 152, 154, and 156 to be sent from the room controller 20 over a one way serial link 115A'-115A" established by the isolation switch 115A to the codec 100A. The isolation switch 115A uses optical fiber, relays or other air gap isolation techniques, to provide a high level of one way isolation between the room controller 20 and the codec 100A. Any backward-directed flow of signals from the codec 100A to the room controller 20 is prevented through the isolation switch 115A. This eliminates the ability of the room controller 20 to access any network or conference information from the codec through the isolation switch 115A.

A processor 160A is connected to the serial link isolation switch 115A to examine the serial commands and pass only legitimate commands over serial link 100A' to the control interface of the codec 100A. Commands are blocked by the processor 160A, which would request the codec 100A to perform actions that might be considered a security violation. Example operations that might be considered a security violation are, for example a GET command to retrieve data from the codec 100A or a MOV command to move a block of data from one memory location to another in the codec 100A.

The room control isolator 10A permits only status information to be returned from the codec 100A to the room controller 20 over one or more one way status links 116A'-116A" to 120A'-120A" established by one or more isolation switches 116A to 120A connected through the processor 160A to the codec 100A. The status information is simple two state status indicators such as "Command Acknowledged", "Error", "Ready", "Call Up", and "Incoming Call".

The processor 160A coupled between the one way status links 116A'-116A" to 120A'-120A" and the codec 100A receives an acknowledgment message over serial link 100A" of the original serial command, from the control interface of the codec 100A, filters the acknowledgment message to pass only the two state status indicator resulting from the serial command, and signals the teleconferencing room controller 20 over one of the one way status links 116A'-116A" to 120A'-120A" of success or error. In this manner, classified information in the codec 100A cannot be accessed by the room controller 20.

The isolation switches 116A to 120A use optical fiber, relays or other air gap isolation techniques, to provide a high level of switched, one way isolation between the room controller 20 and the codec 100A. The isolation switches 116A to 120A operate similarly to relays and are controlled by the processor 160A to selectively connect the two state status indicator signals filtered by the processor 160A, to the room controller 20. This eliminates the ability of the room controller 20 to access any network or conference information from the codec through the isolation switch 115A. In this manner, classified information that may be present in the codec 100A cannot be accessed by the room controller 20.

Figure 2A:
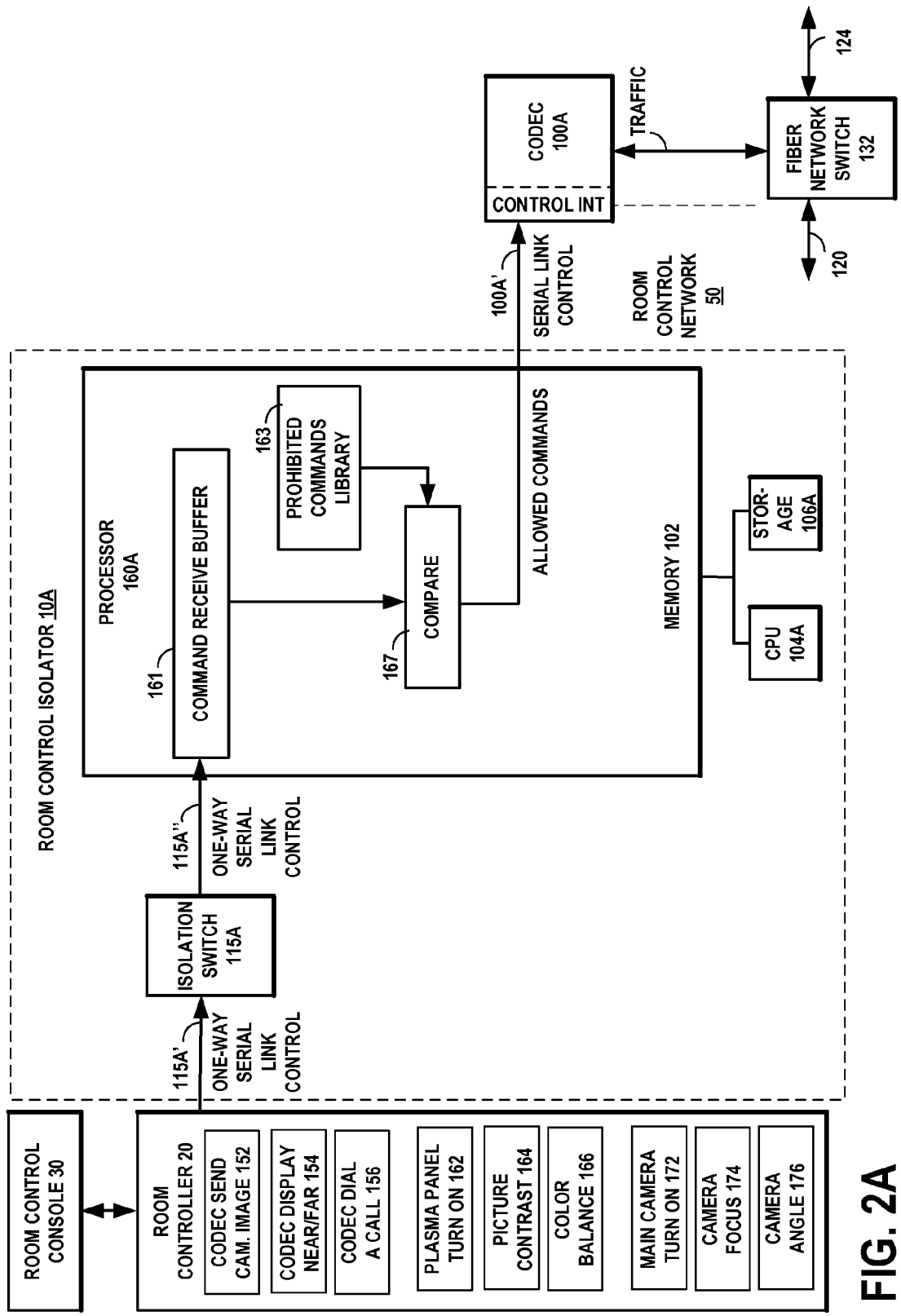
FIG. 2A is an example network diagram showing the secure room control isolator of FIG. 1 in more detail, with a processor and a memory coupled between a serial link air gap isolator and a codec.
Figure 2B:
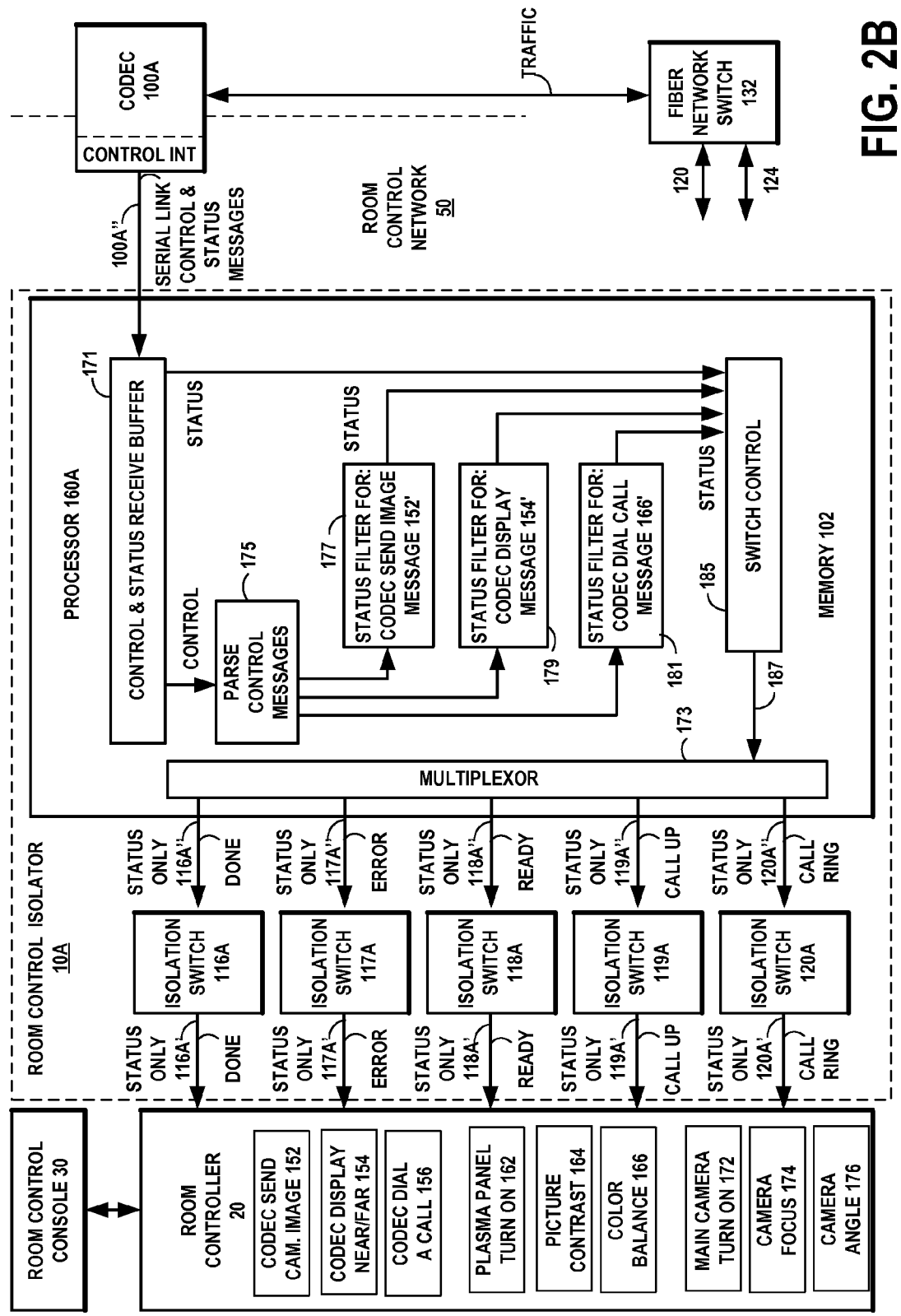
FIG. 2B is an example network diagram showing the secure room control isolator of FIG. 1 in more detail, with the processor and memory coupled between air gap isolated status lines and a codec.

FIG. 2A is an example network diagram showing the secure room control isolator 10A of FIG. 1 transferring room control commands to the codec 100A. The processor 160A and its memory 102 of the room control isolator 10A are coupled between the serial link isolation switch 115A and the codec 100A. The processor 160A includes a CPU 104A and a storage device 106A, to execute program instructions stored in the memory 102, to carry out the functions of the room control isolator 10A. FIG. 2B is an example network diagram showing the secure room control isolator of FIG. 1 receiving acknowledgement messages from the codec 100A. The processor 160A and its memory 102 of the room control isolator 10A are coupled between the one or more isolation switches 116A to 120A and the codec 100A.

In an example embodiment of the invention, the secure room control isolator 10A may include the serial link air gap isolator or isolation switch 115A coupled to the teleconferencing room controller 20 over the one way serial link 115A'-115A" established by the isolation switch 115A to the codec 100A. The secure room control isolator 10A may include at least one air gap isolated status line 116A'-116A" to 120A'-120A" coupled to the teleconferencing room controller. The processor 160A and memory 102 coupled between the serial link air gap isolator 115A and codec 100A, is configured with program instructions, which when executed by the processor, receives serial commands in the command receive buffer 161 constrained to flow in only one direction by the serial link air gap isolator 115A from the teleconferencing room controller 20. The processor 160A examines the serial commands in the compare function 167 by comparing the received commands with prohibited commands stored in library 163, to pass only legitimate commands that are not a security violation, to the codec 100A. The buffer 161, compare function 167, and library 163 represent program instructions in memory 102 that perform those functions when executed by the CPU 104A. The processor 160A transmits one of the legitimate commands to the control interface of the codec 100A.

The processor 160A receives an acknowledgment message in the control and status receive buffer 171 on line 100A" from the control interface of the codec 100A, in response to the original legitimate command. The processor 160A parses the acknowledgment message in parser 175 and filters the acknowledgment message in filters 177, 179, or 181, depending on which type of acknowledgment message is identified by the parser 175, message 152' for the codec to send a camera image, message 154' for the codec to display the meeting room (near side) and the remote VTC system (far side), and message 156' for the codec to dial a call. Then the switch control 185 passes only a simple two state status indicator of the status of the codec resulting from the original legitimate command.

The switch control 185 receives the status result output of the respective filter 177, 179, or 181 and sends a selection signal on line 187 to the multiplexor 173 to send an enabling signal to a selected one of the isolation switches 116A to 120A, depending on whether the acknowledgment message indicates success, error, ready, call up, or call ring. An enabling signal for "success" (or "done") is sent on line 116A" to the isolation switch 116A. An enabling signal for "error" is sent on line 117A" to the isolation switch 117A. An enabling signal for "ready" is sent on line 118A" to the isolation switch 118A. An enabling signal for "call up" is sent on line 119A" to the isolation switch 119A. An enabling signal for "call ring" is sent on line 120A" to the isolation switch 120A. The switch control 185 transmits only the simple two state status indicator through the selected one of the isolation switches 116A to 120A, to the teleconferencing room controller 20, in order to prevent classified information in the codec 100A from being transmitted to the room controller 20. The buffer 171, parser 175, filters 177, 179, and 181, switch control 185 and multiplexor 173 represent program instructions in memory 102 that perform those functions when executed by the CPU 104A. The resulting embodiments of the invention provide a secure room control isolator that meets the DISA and other standard security requirements and enhances operation, management and control of a video teleconferencing room.

FIG. 3 is an example network diagram showing the details of the air gap isolated status lines controlled by the processor and memory of the secure room control isolator of FIG. 1. The switch control 185 sends an enabling signal to one of the isolation switches 116A to 120A. The switch control 185 receives the status result output of the respective filter 177, 179, or 181 and sends an enabling signal to one of the isolation switches 116A to 120A, depending on whether the acknowledgment message indicates success, error, ready, call up, or call ring. An enabling signal for "success" (or "done") is sent on line 116A" to the isolation switch 116A. An enabling signal for "error" is sent on line 117A" to the isolation switch 117A. An enabling signal for "ready" is sent on line 118A" to the isolation switch 118A. An enabling signal for "call up" is sent on line 119A" to the isolation switch 119A. An enabling signal for "call ring" is sent on line 120A" to the isolation switch 120A.

FIG. 4 is an example flow diagram of the process 400 for the operation of the secure room control isolator 10A. An example method performed by the secure room control isolator has the following steps:

Step 402: receiving in a processor serial commands constrained to flow in only one direction by a serial link air gap isolator from a teleconferencing room controller;

Step 404: examining the serial commands in the processor to pass only legitimate commands that are not a security violation, to a codec;

Step 406: transmitting by the processor one of said legitimate commands to the codec;

Step 408: receiving in the processor an acknowledgment message from the codec, of the legitimate command;

Step 410: filtering the acknowledgment message in the processor to pass only a status of the codec resulting from the legitimate command; and Step 412: transmitting only the status from the processor through an air gap isolated status line to the teleconferencing room controller, to prevent classified information in the codec from being transmitted to the room controller.

The method performed by the secure room control isolator 10A may be implemented by a computer program stored in memory 102 as a sequence of programmable instructions which, when executed by the processor 160A associated with the secure room control isolator 10A, carries out the functions of the secure room control isolator 10A. The example program may be stored in a computer readable medium such as memory 102 storing computer executable program code.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

The resulting embodiments of the invention provide a secure room control isolator that meets the DISA and other standard security requirements and enhances operation, management and control of a video teleconferencing room.

Although example embodiments of the invention have been disclosed, a person skilled in the art will understand that changes can be made to the example embodiments without departing from the spirit and scope of the invention.

What is claimed is:

1. A method comprising:
   receiving in a processor serial commands constrained to flow in only one direction by a serial link air gap isolator from a teleconferencing room controller;
   transmitting by the processor one of said commands to a codec;
   receiving in the processor an acknowledgment message from the codec, of the command;
   filtering the acknowledgment message in the processor to pass only a status of the codec resulting from the command; and
   transmitting only the status from the processor through an air gap isolated status line to the teleconferencing room controller, to prevent classified information in the codec from being transmitted to the room controller.

2. The method of claim 1, which further comprises:
   examining the serial commands in the processor to pass only legitimate commands that are not a security violation, to the codec.

3. The method of claim 1, wherein said air gap isolator is an isolation switch that uses optical fiber, relays or other air gap isolation techniques, to provide a high level of one way isolation between the room controller and the codec.

4. The method of claim 1, wherein said air gap isolated status line includes an isolation switch that uses optical fiber, relays or other air gap isolation techniques, to provide a high level of one way isolation between the room controller and the codec.

5. The method of claim 4, wherein said air gap isolated status line includes an isolation switch that is controlled by the processor to selectively pass the status of the codec as a two state status indicator signal to the room controller.

6. A computer executable program code stored in a medium which, which when executed by a processor, performs the functions of a secure room control isolator, comprising:

computer executable program code in the medium which, when executed by a processor, performs the step of receiving serial commands constrained to flow in only one direction by a serial link air gap isolator from a teleconferencing room controller;

computer executable program code in the medium which, when executed by a processor, performs the step of transmitting by the processor one of said commands to a codec;

computer executable program code in the medium which, when executed by a processor, performs the step of receiving in the processor an acknowledgment message from the codec, of the command;

computer executable program code in the medium which, when executed by a processor, performs the step of filtering the acknowledgment message in the processor to pass only a status of the codec resulting from the command; and computer executable program code in the medium which, when executed by a processor, performs the step of transmitting only the status from the processor through an air gap isolated status line to the teleconferencing room controller, to prevent classified information in the codec from being transmitted to the room controller.

7. The computer executable program code stored in a medium of claim 6, which further comprises:

computer executable program code in the medium which, when executed by a processor, performs the step of examining the serial commands in the processor to pass only legitimate commands that are not a security violation, to the codec.

8. The computer executable program code stored in a medium of claim 6, wherein said air gap isolator is an isolation switch that uses optical fiber, relays or other air gap isolation techniques, to provide a high level of one way isolation between the room controller and the codec.

9. The computer executable program code stored in a medium of claim 6, wherein said air gap isolated status line includes an isolation switch that uses optical fiber, relays or other air gap isolation techniques, to provide a high level of one way isolation between the room controller and the codec.

10. The computer executable program code stored in a medium of claim 6, wherein said air gap isolated status line includes an isolation switch that is controlled by the processor to selectively pass the status of the codec as a two state status indicator signal to the room controller.

11. An apparatus, comprising:

a serial link air gap isolator coupled to a teleconferencing room controller;

at least one air gap isolated status line coupled to the teleconferencing room controller;

a processor and a memory coupled between the serial link air gap isolator and a codec, configured with program instructions, which when executed by the processor, receives serial commands constrained to flow in only one direction by the serial link air gap isolator from the teleconferencing room controller;

the processor and memory configured with program instructions, which when executed by the processor, transmits one of said commands to the codec;

the processor and memory configured with program instructions, which when executed by the processor, receives an acknowledgment message from the codec, of the command;

the processor and memory configured with program instructions, which when executed by the processor, filters the acknowledgment message to pass only a status of the codec resulting from the command; and the processor and memory configured with program instructions, which when executed by the processor, transmits only the status through the air gap isolated status line to the teleconferencing room controller, to prevent classified information in the codec from being transmitted to the room controller.

12. The apparatus of claim 11, which further comprises:

the processor and memory configured with program instructions, which when executed by the processor, examines the serial commands to pass only legitimate commands that are not a security violation, to the codec.

13. The apparatus of claim 11, wherein said air gap isolator is an isolation switch that uses optical fiber, relays or other air gap isolation techniques, to provide a high level of one way isolation between the room controller and the codec.

14. The apparatus of claim 11, wherein said at least one air gap isolated status line includes an isolation switch that uses optical fiber, relays or other air gap isolation techniques, to provide a high level of one way isolation between the room controller and the codec.

15. The apparatus of claim 11, wherein said at least one air gap isolated status line includes an isolation switch that is controlled by the processor to selectively pass the status of the codec as a two state status indicator signal to the room controller.

* * * * *